E. M. MUNRO.
UNIVERSAL OR LIKE JOINT.
APPLICATION FILED APR. 18, 1918.
1,316,380.
Patented Sept. 16, 1919.
3 SHEETS—SHEET 3.
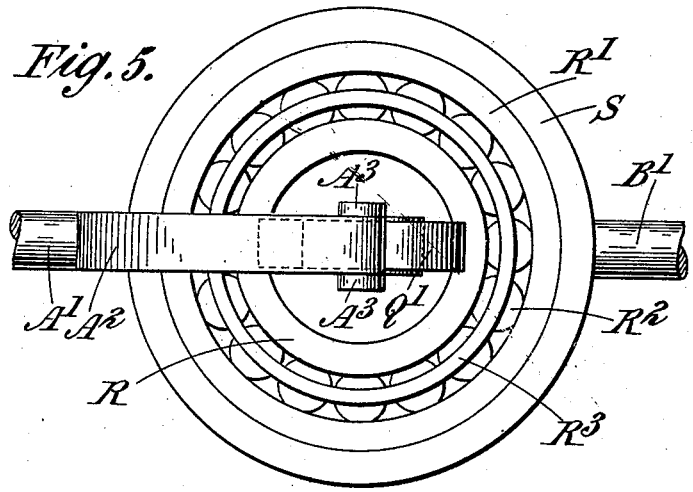
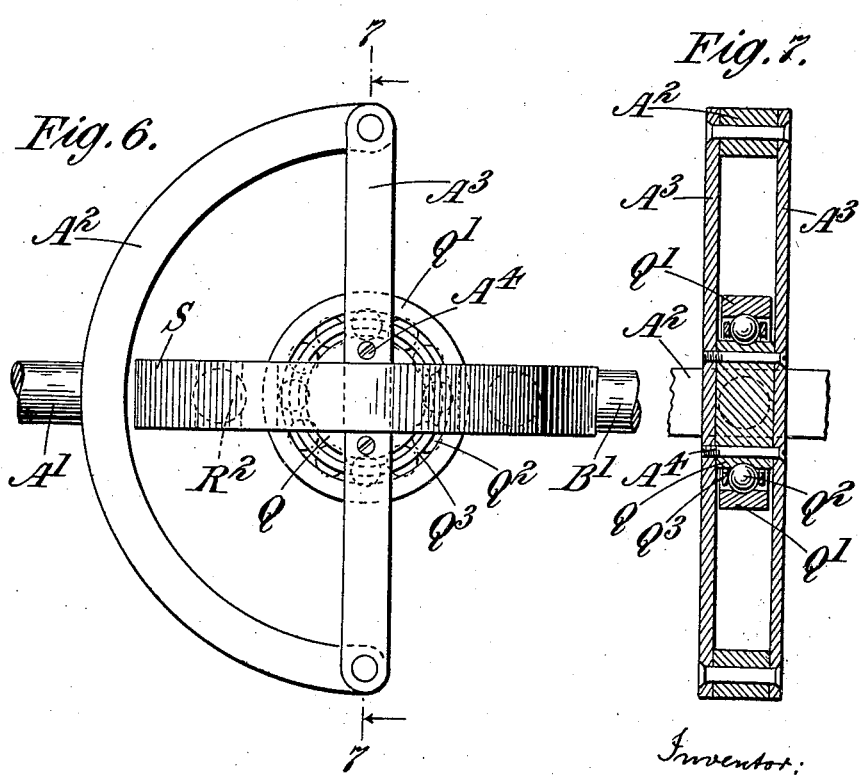

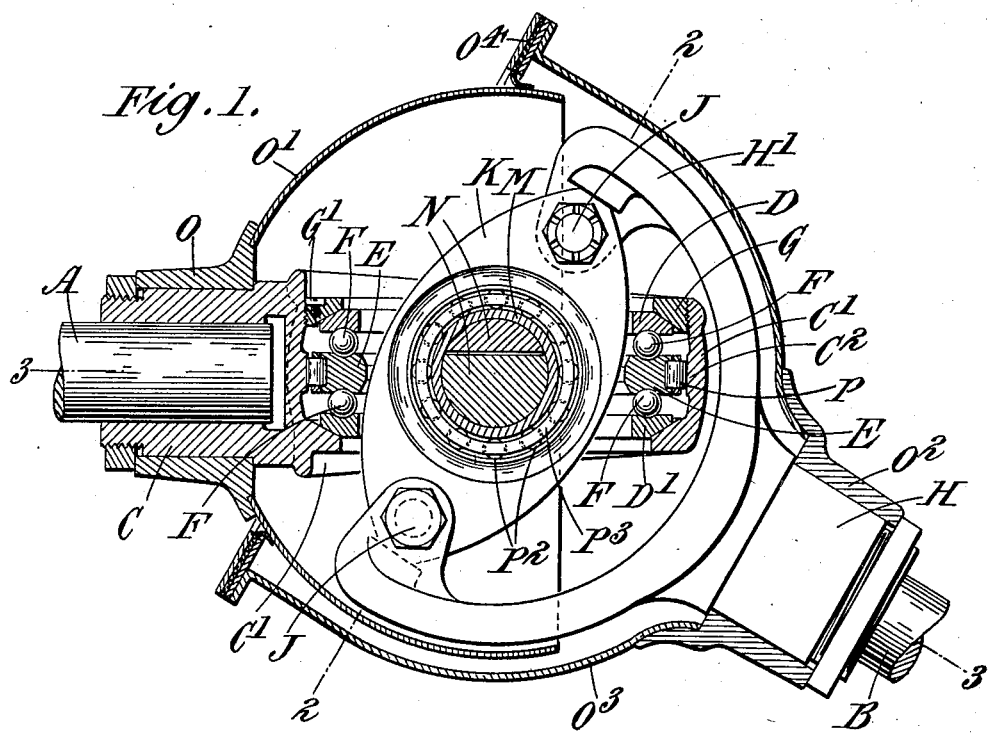
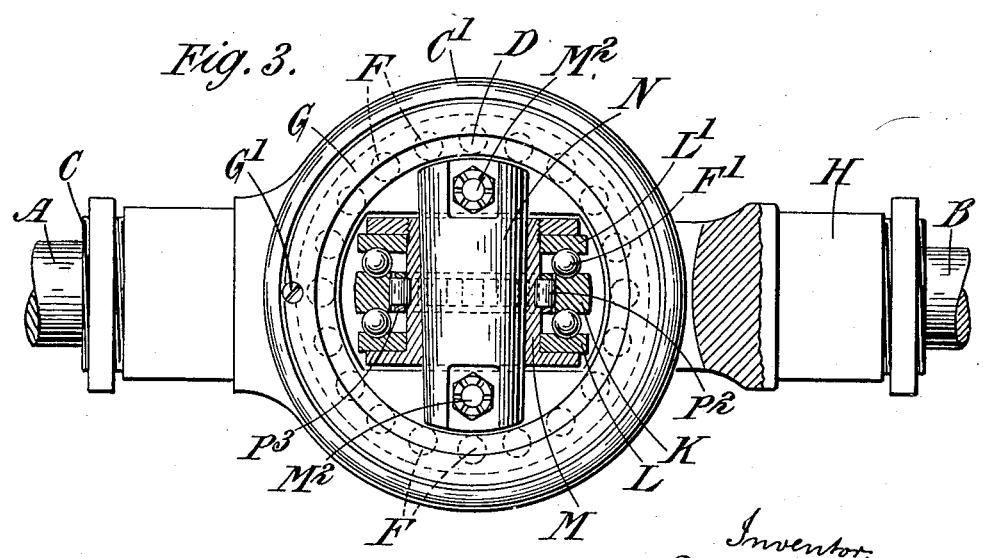

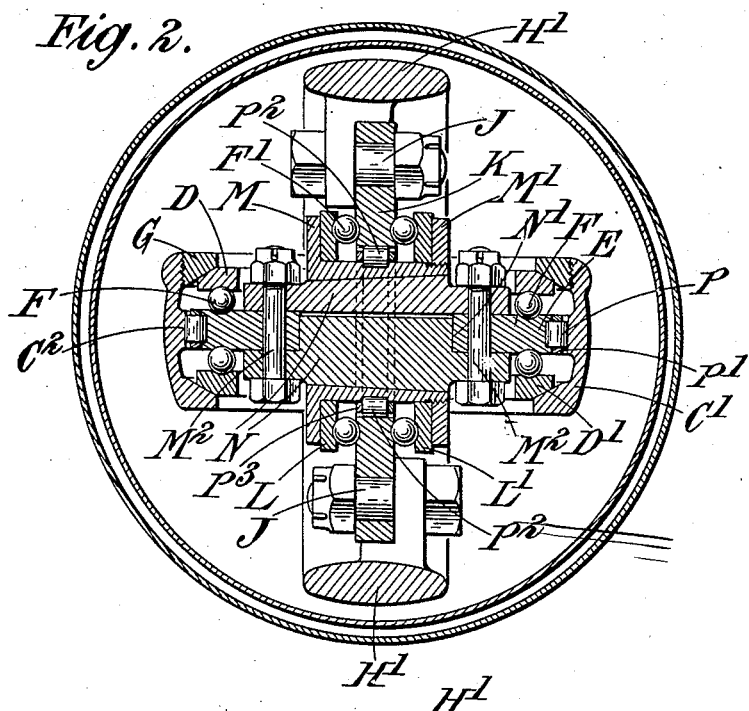
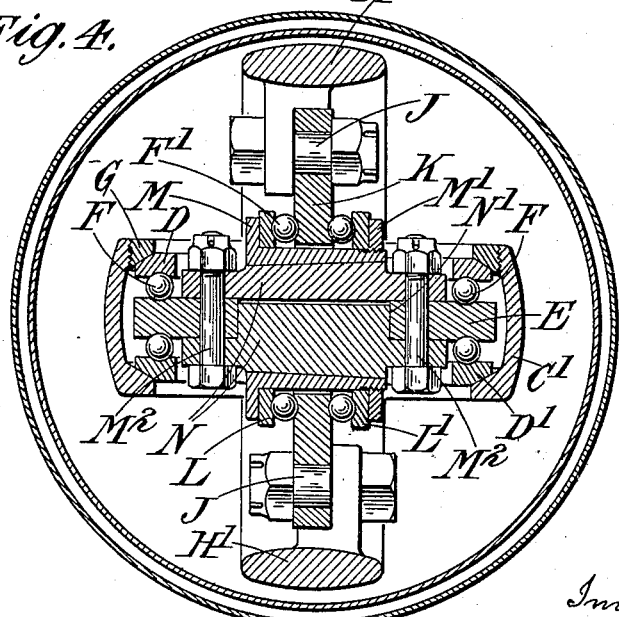

UNITED STATES PATENT OFFICE.

EDWARD MAY MUNRO, OF LONDON, ENGLAND.

UNIVERSAL OR LIKE JOINT.

1,316,380.  Specification of Letters Patent.  Patented Sept. 16, 1919.

Application filed April 18, 1918. Serial No. 229,360.

*To all whom it may concern:*

Be it known that I, EDWARD MAY MUNRO, a subject of the King of England, and residing at London, in England, have invented certain new and useful Improvements in Universal or like Joints, of which the following is a specification.

This invention relates to universal and like joints and has particular reference to an improved construction of the "Hooke" joint used for transmitting power through shafts which are out of alinement with each other.

It is well known that speaking generally joints of this type are inefficient as considerable friction is present and results in loss of power and excessive wear. This is particularly the case when the angle between the two shafts is considerable.

To obviate these disadvantages and increase the efficiency, a joint according to the present invention is provided with two annular members having friction balls or rollers.

Conveniently these members may be made after the manner of ball bearings, preferably though not necessarily of the thrust type, and are arranged one within the other at right angles the inner portion of the outside member being fixed to the outer portion of the inside member. One of the shafts is secured to the free *i. e.* the unattached portion of the outside member and the other shaft is secured to the free portion of the inside member.

This construction may be regarded as a Hooke's joint in which the pivoting of the members is transferred from small pivots at each end to one or more annuli near the center of the joint. Friction and consequent wear and strain are thus avoided.

In one convenient construction the joint may comprise two annular members each consisting of a casing or housing a central thrust plate and another plate screwed or otherwise fitted into the rim of the housing of which it forms the cover or lid. Between the housing and one side of the central or thrust plate is an annular ball race and balls and another annular race and set of balls is provided on the other side of the thrust plate between it and the side member or cover. The diameters of the two members are such that one may be passed within the other at right angles thereto and the central portion or thrust plate of, say, the outer member may be connected in any convenient way with the housing or casing of the inner member. In this case the socket for one shaft may be formed with or secured to the outer portion or housing of the outer member while the other shaft is secured, say, by a yoke to the inner portion of the inside member.

In a simple form intended for the transmission of a small amount of power it is not necessary to employ bearings specially designed to take thrust as many of the known forms of journal ball bearings are capable of transmitting power through the balls without the provision of a special thrust plate. Such a simple form may be constructed according to this invention by taking two annular journal ball bearings with their casings and cages, one larger than the other, and placing the smaller one within the larger one at right angles thereto securing the outside of the inner bearing to the inside of the outer bearing. The socket for the one shaft is then secured to the outside of the outer bearing while the socket for the other shaft is secured by a fork to the inside of the inner bearing sufficient clearance being left between the arms of the fork to leave the casing of the outer bearing free. When very heavy loads are to be transmitted and more particularly when the angle between the two shafts is comparatively large, it is desirable to provide for a certain amount of journal thrust, which is thrust in the direction of the axes of the shafts, as well as lateral thrust, which is thrust at right angles to the axes of the shafts, and in such cases the joint is provided with two sets of friction balls or rollers, one set taking mainly lateral thrust and the other mainly journal thrust.

In the accompanying drawings,

Figures 1, 2 and 3 illustrate one construction of joint according to this invention, Fig. 1 being a horizontal central section through the joint with the shafts at an angle to each other; Fig. 2 a transverse section on the line 2—2 of Fig. 1 but assuming the shafts to be in alinement and Fig. 3 a section on the line 3—3 of Fig. 1 again assuming the shafts to be in line. Certain parts are omitted from Fig. 1 for the sake of clearness.

Fig. 4 is a view similar to Fig. 2 but showing a construction of the joint similar in all respects to that illustrated in Figs. 1, 2 and 3 except that the additional sets of friction rollers for taking mainly journal thrust are not provided.

Figs. 5, 6 and 7 show a simple construction of joint also according to this invention suitable for use where comparatively small power is to be transmitted; Figs. 5 and 6 being elevations at right angles to each other and Fig. 7 a section on the line 7—7 of Fig. 6.

With reference first to Figs. 1, 2 and 3 the two shafts to be coupled by the joint are shown at A and B. To the shaft A is fitted a socket C forming part of a housing, ring, or annular casing C' containing two outer ball race disk D and D' and an inner ring or thrust plate E. Balls F are placed between the members D and E and D' and E in the manner usual in a thrust ball bearing the various parts being kept in place by a ring G screwed into the housing C' and fitted with a locking screw G'.

The shaft B is fitted with a socket H forming part of a yoke or fork H' connected by bolts J to a plate K which is the thrust plate or inner member of another ball bearing at right angles to the bearing formed by the parts D D' E and F attached to the shaft A. The balls F' of this second ball bearing work between the thrust plate K and ball race rings L and L' (see Figs. 2 and 3). These rings are mounted on a flanged sleeve M and are kept in place by a nut M'. The interior of the sleeve M is tapered and contains a split taper pin N. One part of this pin is cut away at each end leaving a central projecting portion or boss N' which fits into a hole in the thrust plate E of the bearing attached to the shaft A and the two portions of the pin are bolted together by bolts M² which pass through the plate E. Thus the central or inner member E of the one ball bearing is rigidly connected to the outer members L L' of the other ball bearing while the inner member or element K of that other ball bearing is connected through the yoke H' and the socket H to the shaft B and the outer members D D' of the first ball bearing are connected through the housing C' and socket C to the shaft A.

Upon the socket C is mounted a sleeve O to which a guard O' forming part of the sphere is attached and the socket H attached to the shaft B carries a similar sleeve O² to which is attached a somewhat larger guard O³ the mouth of which is provided with a flexible washer O⁴ formed so as to make a running joint over the guard O'. These two guards thus form an inclosing dust-tight case for the joint whatever position the shafts A and B may assume. So far the description applies in every respect to the construction of joint shown in Fig. 4 as well as to that illustrated in Figs. 1, 2 and 3 and for all ordinary loads the joint shown in Fig. 4 answers all requirements.

It will be seen that the two sets of ball bearings are placed so as to transmit lateral thrust, but to provide for the transmission of very heavy loads with the shafts inclined at a considerable angle to each other, other friction members are provided to take journal thrust.

These additional members in the construction illustrated in Figs. 1, 2 and 3 are in the form of two sets of roller bearings. One of these comprises a number of rollers P supported in a cage P'. These rollers work between the slightly recessed outer surface of the thrust plate E and a running surface on the inside of the housing C'.

The other set of journal bearings comprises rollers P² held in a cage P³ and operating between the slightly recessed surface of the sleeve M (Figs. 1 and 2) and the inside surface of the thrust plate K. Details of these roller bearings P, P' and P², P³ are not shown as they may be of the usual well known constructions.

When the amount of power to be transmitted is small a simpler form of joint illustrated in Figs. 5, 6 and 7 may be used in which a definite thrust plate is not provided. It is well known that ball bearings of this and other simple types can be used satisfactorily in situations where a comparatively small lateral thrust is applied to the balls. In Figs. 5, 6 and 7 the shaft A' is provided with a yoke or fork A² having riveted or otherwise attached to it two bars A³. These bars are secured, as for instance, by studs A⁴ to the inner member Q of a ball bearing having an outer member Q', the balls Q² working between the members Q and Q' and being provided with a cage Q³. The outer member Q' of this ball race is rigidly connected at right angles to the inner member R of a second larger ball race of a similar construction and the outer member R' of this second ball race is held in a ring S attached to the shaft B'. The balls R² of the second ball race work between the members R and R' and are provided with a cage R³. The details of construction of the two ball bearings need not be particularly described as they do not in themselves form part of the invention and may be of any known and suitable type.

Although it is preferred to employ complete bearings in the joint according to this invention, that is to say, bearings having a complete annulus of balls, yet obviously the improved joint could be made with the balls in each bearing occupying only segments of the circles instead of extending all around.

Again the friction rollers might be replaced by balls or the friction balls by rollers if suitable modifications were made in the design of the coöperating parts.

What I claim as my invention and desire to secure by Letters Patent is:—

1. In a universal or Hooke's joint the combination of two members each comprising two parts with friction balls or rollers working in an annular race between them one race encircling the other, the races being in planes which intersect near the center of the joint, one part of each member being connected to one of the shafts to be coupled while the other parts of the members are secured together.

2. In a universal or Hooke's joint the combination of two annular members one encircling the other, each comprising an inner part and an outer part with friction balls or rollers between them, the shafts to be connected being joined respectively to the outer part of one annular member and the inner part of the other annular member while the remaining inner and outer parts of the annular members are connected together.

3. In a universal or Hooke's joint the combination of two annular thrust bearings provided with friction balls or rollers the inner member or thrust plate of one bearing being connected to the outer plates or races of the other bearing while the outer plates or races of the one bearing are connected to one shaft and the thrust plate of the other bearing is connected to the other shaft.

4. In a universal or Hooke's joint the combination of two annular thrust bearings each comprising an inner member or thrust plate, an outer member or race and friction balls or rollers between them, a rigid connection between the inner member of the one bearing and the outer member of the other bearing and operative connections between the outer member of the one bearing and one of the shafts to be coupled and between the inner member of the other bearing and the other shaft to be coupled.

5. In a universal or Hooke's joint the combination of two annular thrust bearings each comprising an inner member or thrust plate, an outer member or race and friction balls or rollers between them, a rigid connection between the inner member of the one bearing and the outer member of the other bearing, operative connections between the outer member of the one bearing and one of the shafts to be coupled and between the inner member of the other bearing and the other shaft to be coupled and other friction balls or rollers between the inner and outer members of each bearing disposed so as to take journal thrust.

6. A universal joint for connecting two rotatable shafts, comprising in combination, a ring carried by one shaft with its axis at right angles to the axis of the shaft, a pin diametrically disposed in said ring and carried thereby for rotation about the axis of the ring, an element rotatably mounted on the pin at its middle point, and a yoke connected to the second shaft and straddling said ring, the arms of said yoke being connected to the ends of said element.

7. A universal joint for connecting two rotatable shafts comprising in combination an annular member carried by one shaft with its axis at right angles to the axis of the shaft, a pin diametrically disposed in said annular member and carried thereby for rotation about the axis of the annular member, an element rotatably mounted on said pin at its middle point, and a yoke connected to the second shaft and having its arms connected to said element.

8. A universal joint for connecting two rotatable shafts, comprising in combination, a ring carried by one shaft with its axis at right angles to the axis of the shaft, a second ring carried by said first mentioned ring concentric therewith and rotatable about the common axis, a pin diametrically disposed across said second ring and having its ends secured thereto, an element rotatably mounted on the pin at its middle point, and a yoke connected to the second shaft and straddling said ring, the arms of said yoke being connected to the ends of said element.

9. A universal joint for connecting two rotatable shafts comprising in combination, a ring carried by one shaft with its axis at right angles to the axis of the shaft, a second ring concentric with and carried by said first mentioned ring and rotatable about the common axis, anti friction means interposed between said rings, a pin diametrically disposed across said second ring and having its ends secured thereto, an element rotatably mounted on the pin at its middle point, anti-friction means between the first and said element, and a yoke connected to the second shaft and straddling said ring, the arms of said yoke being connected to the ends of said element.

10. A universal joint for connecting two rotatable shafts comprising in combination an annular member carried by one shaft, with its axis at right angles to the axis of the shaft, a yoke member carried by the second shaft, and means operatively connecting said yoke and annular member, said means including an element connected to the yoke and an element connected to the annular member and rotatable around the axis of the annular member, the axis of each element bisecting the axis of the other, and one of them being rotatably mounted on the other.

In testimony whereof I have signed my name to this specification in the presence of two subscribing witnesses.

EDWARD MAY MUNRO.

Witnesses:
WILLIAM GEORGE FRASER NELSON,
ARTHUR HINGSTON DYSMOND.